United States Patent [19]
Berreman et al.

[11] 3,787,110
[45] Jan. 22, 1974

[54] LIQUID CRYSTAL DEVICES

[75] Inventors: Dwight Winton Berreman, Westfield; Saul Meiboom, Berkeley Heights; Donald Lawrence White, Bernardsville; Frederic Jay Kahn, Stirling, all of N.J.

[73] Assignee: Bell Telephone Laboratories, Incorporated, Murray Hill, N.J.

[22] Filed: June 23, 1972

[21] Appl. No.: 265,459

[52] U.S. Cl.............................. 350/160 LC, 350/150
[51] Int. Cl. ............................................... G02f 1/16
[58] Field of Search....................... 350/160 LC, 150

[56] References Cited
UNITED STATES PATENTS
3,700,306   10/1972   Cartmell et al..................... 350/150
3,728,007   4/1973   Wyrenne et al. ............. 350/160 LC
3,600,061   8/1971   Heilmeier et al. ............. 350/160 LC

*Primary Examiner*—Edward S. Bauer
*Attorney, Agent, or Firm*—W. L. Keefauver et al.

[57] ABSTRACT

Liquid crystal devices, an operation state of which is dependent upon substantially unidirectional liquid crystal orientation, includes a contacting surface which has parallel grooves or ridges. Liquid crystal orientation is attributed to minimization of elastic energy.

21 Claims, 6 Drawing Figures

LIQUID CRYSTAL DEVICES

BACKGROUND OF THE INVENTION

1. Field of the Invention. The invention is concerned with liquid crystal devices which, at least in one operating state, involve liquid crystal alignment. Such devices, operation of which may be dependent upon changes in scattering, transmission, or reflection associated with operating states differing one from the other by a change in liquid crystal orientation, may serve as switches, memories, display devices, etc.

2. Description of the Prior Art

There has been a growing interest, both scientific and technological, in the unusual class of liquid materials which evidence varying degrees of crystalline order. These materials have been known for some time, see G. W. Gray *Molecular Structure and Properties of Liquid Crystals*, Academic Press, 1962. Liquid crystals are traditionally considered to fall into any of three classes: nematic (directional but not positional ordering with molecules generally aligned unidirectionally in non-layered fashion throughout the bulk of at least a portion of the liquid), cholesteric (in which molecular alignment is essentially like the nematic variety locally (and considered a species of nematics) but in which succeeding molecules rotate so as to result in helical alignment), and smectic (in which there is some degree of layered ordering).

A review article at page 20 in *Electro-Optic Systems Design*, February 1972, describes a number of device applications for liquid crystals. Devices described may serve a number of functions, e.g., memory, switching, polarizing, polarization detecting, modulation, as a controllable dichroic element, display, etc.

Display devices are exemplary and, at least at the present time, it would appear that it is primarily in this area that attention is focused. As compared with competing devices, liquid crystal devices generally require lower power level for switching between the operating states (to produce changes in transmission, scattering, reflection, etc.). A distinct further energy saving results from the fact that they may utilize ambient lighting. Power requirements for certain types of liquid crystal displays are small. Typical operating power requirements are of the order of 1/100 of that required for displays including light sources.

Liquid crystal devices fall into a variety of categories. In general, a characteristic in common with most such devices is that readout is optical. In general, information, regardless of type; whether transitory or permanent; whether binary or analog; whether numerical or pictorial; whether reflective or transmissive; involves some change in ordering.

The most common type of device at this time involves "dynamic scattering". In accordance with this mechanism, the unenergized liquid crystalline medium is aligned and so is essentially transparent to light. A change in ordering is produced by an actual passage of ionic current through the medium so as to produce a degree of turbidity thereby converting the medium generally to a milky white or opaque appearance. Energization may be d.c. or a.c. with some preference for the latter in terms of increased lifetime for the device. At certain critically high frequencies using a.c. energizing, response time is shortened due to oscillating domains instead of the turbidity which occurs in the usual dynamic scattering device. This latter effect is sometimes designated "fast turn-off mode". Response times have been reported as less than 5 milliseconds as compared with 100 to 200 milliseconds for the more common dynamic scattering.

Both dynamic scattering and turn-off mode devices are ordinarily transitory in the sense that the effect of the turbidity disappears when the energy source is turned off. A permanent memory results if some cholesteric material is included with the usual nematic phase. The twist introduced by the cholesteric fraction tends to lock the medium. Erasure may naturally occur over a long term or may be accomplished by temperature increase. Erasure can be induced by application of a high frequency a.c. voltage.

Disorder or a change in order may be introduced thermally. Media of the type described may exist as solids over the lowest temperature range of interest, next as smectic liquid crystals over the next increasing temperature range, next as nematic (sometimes taking the form of cholesteric) over the next increases in temperature range, and finally as a disordered or conventional liquid at the highest range of interest. Phase transitions, particularly as between the various liquid states which may be introduced thermally, are invariably accompanied by a change in optical properties of one form or another. Change may involve disordering (resulting from heating the nematic (or cholesteric) phase) in the manner of the dynamic scattering device described above or as a change in ordering as between liquid phases sometimes with the assistance of polarizers which may produce a change, for example, in opacity, color, etc.

A significant class of devices yet to be developed to a level of commercial feasibility depend on field effect rather than actual current flow. Such devices, which may utilize one or more transparent electrodes, again, generally involve a medium which is oriented before being energized. The effect of the field is to produce disorder or sometimes a change in order. The latter may utilize crossed polarizers where both ordering directions are transversed to the interrogation direction or may depend on a change in transparency where one of the ordering directions is parallel to the viewing direction. Field effect devices utilizing cholesteric materials may depend on color changes (with color generally being introduced or enhanced when the order is such that the helical axis is parallel to the interrogation direction). Devices may depend on a variation in a number of optical properties, e.g., absorption, scattering, diffraction, refraction.

A number of reasons exist for utilizing mixed media. Mixtures of nematic phase materials (and nematic is hereafter used in the generic sense in this description as including cholesteric) may be to change and/or increase initiation or range of temperature in which this phase is stable. Nematic phase material exhibiting no cholesteric ordering may be modified by inclusion of small amounts of cholesteric variant to bring about permanency of the imposed signal. Solvent-solute systems are sometimes necessary where it is desired to utilize material which, in the pure form, transforms directly from solid to disordered liquid. Color may be introduced by inclusion of dyestuff which aligns with the nematic phase material so as to enhance the dichroism inherent in this phase or so as otherwise to change color on undergoing transition between ordered and disordered states. This latter has been referred to as "guest-host interaction effect". Any of the classes of devices discussed above may operate by reflection or transmission. Reflection may make use of a back mirror whereas transmissive effects best utilize sandwiching transparent elements.

Most devices described in the literature utilize electro-optic effects (either conductive or field effect) or thermal effects. Other devices may depend upon the difference in magnetic susceptibility as between different orientations or as between ordered and disordered states. Accordingly, imposition of a magnetic field (like an electric field) may be used to read out any of the above effects or, alternatively, may be used to induce them. It is also known that liquid crystals are strain sensitive so that stress may produce a variety of changes of the nature described above.

Whereas any of the above devices may be operated individually, some also offer the possibility of operation in coincident arrays. Accordingly, requisite current or field, for example, required to induce any of the changes described, may result only at the intersection of two axial directions, each of which is responsible for imposing less than the requisite amount of energy for producing the change.

Devices have thus far been described primarily in a change of state. Workers have, however, not overlooked the possibility of utilizing ordinarily liquid crystals as simple polarizers. In such use, many of the nematic materials particularly when admixed with "guest" dyestuff exhibit extinction ratios comparable to competing polarizing materials. The cholesteric variant is optically active and is sensitive to the sense of circular polarization of an incident beam. Devices based on this latter effect have been proposed.

For the most part, all devices described depend upon at least one operating state corresponding with substantial alignment. Others, while not requiring such alignment, may show enhanced contrast where alignment is achieved. Accordingly, workers have sought out and developed a number of techniques for influencing orientation. It has been generally assumed that orientation of any of the liquid crystal phases is dependent upon Van der Waals forces operating on a molecular level. Accordingly, use has been made of substrate materials which, themselves, consists of long chain linear molecules aligned in the desired direction. Examples of such materials are linear hydrocarbon polymers, such as high density polyethylene, and other materials having little branching. Where use has been made of substrates of other materials, as, for example, silicate glass and the like, a variety of treatments have been used to alter the surface so as to accomplish the desired alignment. One type of alteration is unidirectional rubbing of such a surface with a medium capable of leaving a residue, again, of a long chain molecule. An example is a glass surface altered by rubbing with paper or other cellulosic material. In certain instances, altered surfaces have been replicated by casting, utilizing long chain linear molecule casting materials in the replica surface (see U. S. Pat. No. 3,459,839). The use of intermolecular attraction for producing alignment is a viable approach. It is, however, inherently limited in that substrate material must be of, or include, materials of the requisite molecular variety. Many of the deficiencies noted in devices thus far may be attributed to this restriction in substrate material.

For example, short lifetime may be attributed to interaction of certain types of liquid crystals with certain types of substrate materials. Also, stability of such substrate materials is sometimes poor with deterioration resulting from such ambient conditions as humidity, high temperature, ultraviolet light, ozone, etc.

SUMMARY OF THE INVENTION

In accordance with the invention, alignment of liquid crystals of any of the types described in the preceding section for use in any devices, including those also described in that section, is accomplished on a class of substrates generally incapable of producing such alignment by Van der Waals forces. In general, such alignment results from minimization of elastic energy in the body of the liquid crystal. Alignment results when use is made of a substrate having ridges or grooves of dimensions and spacings of the order of tens of angstrom units or greater. Such grooves or ridges may be produced on an inorganic or organic media totally lacking in the characteristics required for the traditional mechanism utilizing Van der Waals forces. Such substrate surfaces may be produced in a variety of manners as by mechanical scoring, casting, etching, photolithography, ion bombardment, etc. Substrate may be totally amorphous, may be polycrystalline, or even crystalline. In the latter, surfaces may be modified with ridges running in a direction different from that which would otherwise be induced by virtue of any influence resulting from the crystallographic lattice itself.

Devices constructed in accordance with the invention may exhibit certain operational advantages over prior art devices. Improved lifetime, for example, may arise simply by reason of the broader class of substrate material now made available. Similarly, longer lifetime may result by elimination or at least lack of dependence on orienting linear long chain molecules which may react with liquid crystals or other media or which may deteriorate due to any of a variety of mechanisms (e.g., reaction between liquid crystal and substrate oxidation of substrate, etc.).

As in relevant prior art devices, there is oftentimes the requirement that liquid crystals be aligned with a major axis parallel to a substrate surface. Under certain circumstances, where the wetting angle is large, such alignment may be accomplished or improved by utilizing an intermediate layer of any of the class of materials known as surfactants. The effect of such material is to increase the wettability of the substrate surface for the liquid crystal.

Alternatively, the prior art has made use of surfactants which induce alignment in a direction orthogonal to the direction of the surface. Such materials, which decrease wetting angle or show an affinity for a specified end portion of a liquid crystal, have been utilized in the fabrication of devices in which an operating state utilizes this type of orientation. Such surfactants may find use in devices constructed in accordance with the invention where a second operating state involves alignment parallel to a substrate surface. In such event, however, alignment, at least in part, induced by the ridges or grooves common to all devices of the invention, is brought about by imposition of an external influence, such as an electric field.

Whereas devices of the invention depend upon alignment of liquid crystals due to surface undulations, certain device designs may be such that different alignment is desired in different localized regions. This is accomplished, in accordance with the invention, merely by changing direction of ridges or grooves, accordingly.

DETAILED DESCRIPTION

The Figures

Figure 1:
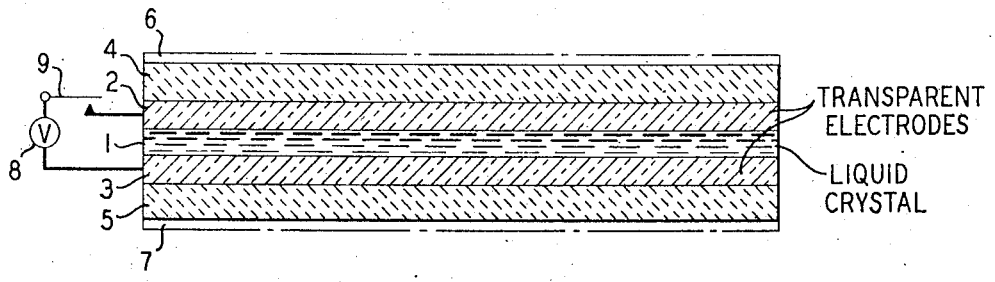
FIG. 1 is a cross-sectional view of a fundamental type of device which may operate on any of the principles set forth.

The arrangement of FIG. 1 includes a liquid crystal layer 1 sandwiched between two electrodes 2 and 3, at least one of which is grooved so as to orient the liquid crystalline material of layer 1. One or both electrodes 2 and 3 may be transparent depending upon whether the device is designed to operate by reflection or transmission. Electrodes 2 and 3 are optionally supported by layers 4 and 5 which are transparent or reflective in accordance with the intended operation of the device shown. Either or both of layers 4 and 5 may be provided with grooves which are replicated by electrodes 2 and 3 so as to finally influence alignment of layer 1 or layers 4 and 5 may be grooved. Elements 6 and 7, shown in phantom, are polarizers which may be crossed or not and which function to introduce or enhance contrast as between two operating states of FIG. 1. Electrodes 2 and 3 are energized by electrical source 8 when switch 9 is closed. Electrical source 8 may function as a current source, in the instance of dynamic scattering devices, or, primarily, as a voltage source in the instance of field effect devices.

The device of FIG. 1 may also be utilized as a simple polarizer by appropriate choice of composition of material 1 and groove orientation of interface/s formed between layer 1 and 2 and/or 3. Polarization may result in the absence of energizing, in which event, electrical source 8 may be eliminated.

Figure 2:
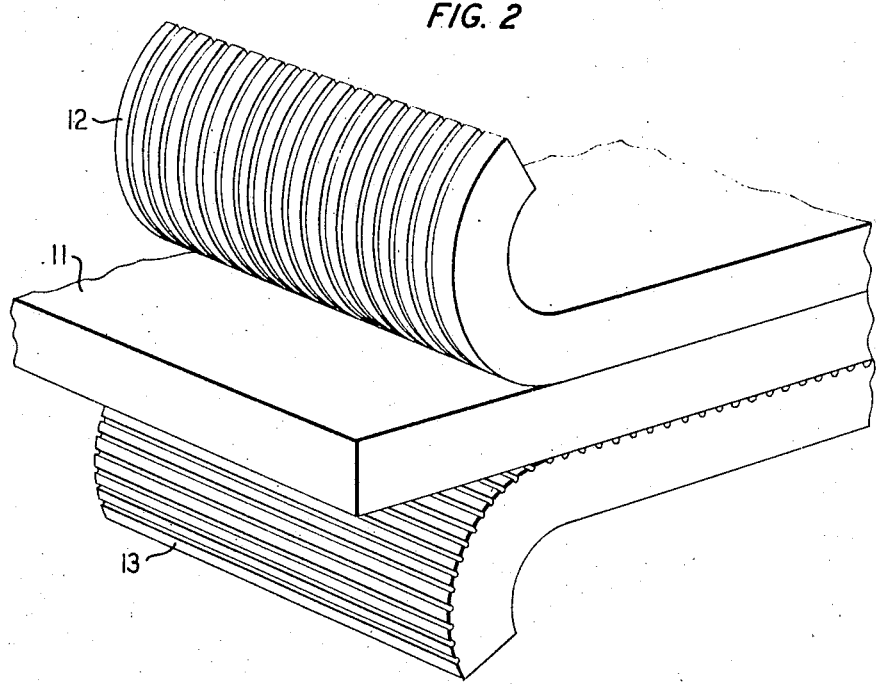
FIG. 2 is a perspective view of a species device which may operate in the manner of the generic device shown in FIG. 1.

FIG. 2 depicted in the form of a device of FIG. 1, represents a species of that device in that electrodes 12 and 13 are grooved orthogonally with respect one to the other on the surfaces forming interfaces with liquid crystalline material 11. The remainder of the device, consisting of necessary or optional elements 14, 15, 16, 17, 18 and 19, may function in the manner discussed in conjunction with FIG. 1. The function of the grooving arrangement shown is to impose a twist in the liquid crystal alignment proceeding from one electrode to the other. Such a device is exemplary of the family of devices herein which produces rotation of the plane of polarization of light. Energization by electrical source 18 upsets the order or, alternatively, reorders the crystals with their major axes perpendicular to the plane surface. Unenergized, the 90° twist imposed on the alignment of the liquid crystal from electrode 11 to electrode 12 results in transmission through crossed polarizers 16 and 17. With a field imposed or with the passage of current, the effect of the crossed polarizers is to block transmission.

Figure 3:
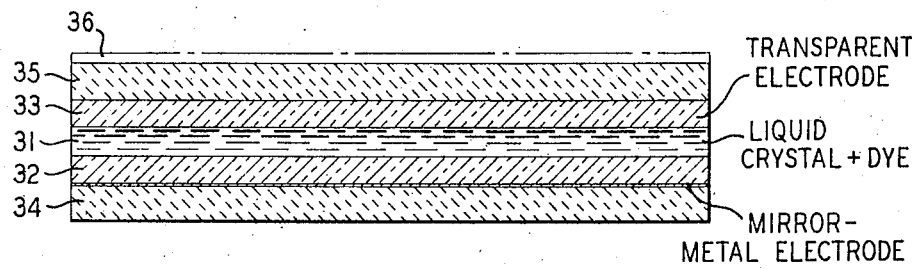
FIG. 3 is a cross-sectional view of a different device in accordance with the invention.

The device of FIG. 3 is a dye cell which may operate by reflection or transmission. It consists of layer 31 of a liquid crystal and dyestuff combination with the dyestuff being of such nature as to align with the liquid crystal. Layer 31 is sandwiched by layers 32 and 33 which may both function as electrodes with current or voltage supplied by source not shown. Both electrodes 32 and 33 may be transparent or, for reflective operation, one, for example, 32, may be mirrored. In common with all devices depicted and described, alignment of the liquid crystal layer 31 is influenced by grooves or ridges which are parallel over at least a portion of one or both of the electrode surfaces forming interfaces with layer 31. Layers 34 and 35, which may serve as the actual substrate bodies, may be constructed of any of the materials described herein. Detailed requirements for the nature of materials contacting the liquid crystalline medium are described in the following section. Layer 36 is so designed as to selectively transmit some portion of light, depending upon the state of liquid crystal layer 31. For example, for a non-cholesteric nematic crystalline layer oriented parallel to a major electrode surface in the non-energized state, polarizer 36 may be crossed with respect to the alignment direction of the liquid crystalline layer. Under such circumstances, light is not transmitted (or reflected) in the unenergized state. With passage of current or application of voltage, layer 31 is disordered or reordered so as to permit transmission (or reflection) of light energy of the appropriate polarization. The purpose of the dyestuff in such a cell is to increase absorption of the liquid crystal for the incident light so as to increase the polarization extinction ratio.

Figure 4A:
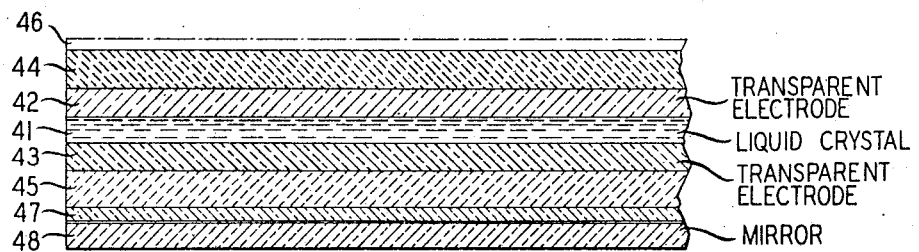
FIG. 4A, B, and C are a composite view and partial electrode detail views of a different device utilizing grooved material in accordance with the invention.
Figure 4B:
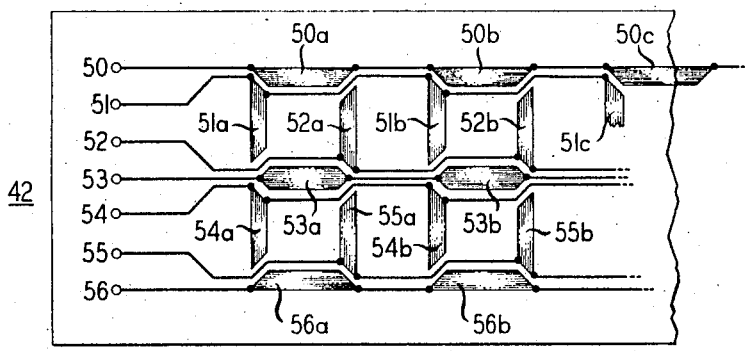
Figure 4C:
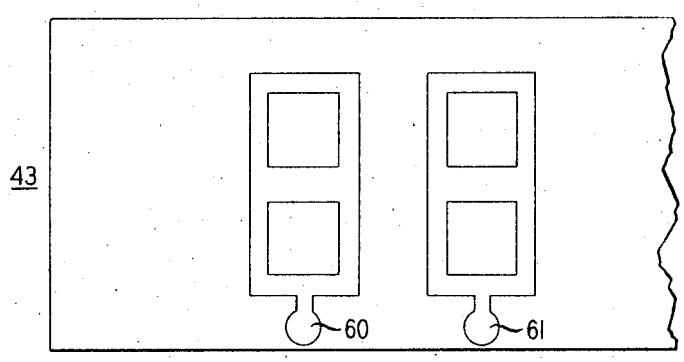

FIGS. 4A, B, and C are an elevational view and electrode details, respectively, of a form of liquid crystal device of a coincident array design designed to operate as a numerical display. The device depicted consists of liquid crystal 41 sandwiching electrodes 42 and 43, supporting layers 44 and 45, and polarizers 46 and 47. Layer 48, shown in phantom, is a mirror which permits use of the depicted device in a reflective mode. Orientation of layer 41, and functioning of all other elements depicted, is, as described in any of the figures above except for the detailed operation of electrodes 42 and 43. Detail FIG. 4B depicts the pattern of electrode 42, while detail FIG. 4C depicts the pattern of electrode 43. Electrode array 42 consists of a seven-segment electrode arrangement found sufficient for numerical display. Electrode 50 results in orientation within the region of crystalline material corresponding with segments 50a, 50b, 50c, etc. Electrode 51 similarly influences regions corresponding with segments 51a, 52a, etc., and similarly denoted segments are influenced by remaining electrodes 52 through 56. Electrodes of electrode layer 43, shown in detail 4C, two of which are designated 60 and 61, define figure eights and are addressed sequentially at times corresponding with desired portions of electrode layer 42. Such a device may operate, for example, in the manner of the device of FIG. 2 with operation as there described. Disalignment or realignment results only in those portions of liquid crystal layer 41 sandwiched between energized segments of electrode layers 42 and 43. The patterns depicted are in commercial use for numerical displays.

The device of FIG. 4A is representative of a family of coincident energy devices which may serve a variety of functions, as displays, either transmissive or reflective. A variety of electrode patterns operating coincidentally, either by passage of current or imposition of field, may result in a variety of symbols or designs of which the patterns of details 4B and 4C are exemplary.

Compositional Requirements a. Substrate

The term substrate in this section has reference to the composition of the surface actually in intimate contact with the liquid crystal. In this sense, this term may have a slightly different meaning from the term as utilized in the figure description. The significance of the substrate surface in intimate contact with the liquid crystal goes to the basic inventive philosphy. The invention is premised primarily on a departure from the prior art in which alignment of liquid crystals was brought about primarily or solely by Van der Waals forces between long chain linear substrate molecules on the one hand and liquid crystal molecules on the other. The essence of the present invention is in alignment being induced on crystal dimensions rather than molecular dimensions. For the purpose of differentiating the present invention over the prior art, it is specified that the nature of the substrate, as defined in this section, is such that intermolecular forces between substrate and liquid crystal cannot be responsible for alignment. Accordingly, it is specified in the negative that the surface of such substrate may not be composed of molecules of sufficient length as to be orientable and/or so oriented as to produce alignment of liquid crystals. Accordingly, it is designated that such substrate, to meet the requirements of the invention, must manifest no long range molecular ordering, by which is meant, an ordering over the dimensions of 1000 angstrom units or greater. Positive terminology is expedient in certain classes of substrate materials. These materials may be preferred by virtue of stability, transparency or other characteristics made available only by virtue of the diversity of materials which may be utilized by following the inventive teaching. In such terms, substrate materials may be truly amorphous, as in typical silicate or other inorganic glasses, or in highly branched polymeric materials, such as polymethylmethacrylate, or they may be polycrystalline or monocrystalline. Such materials are exemplified by tin oxide (a commonly used transparent electrode material) and quartz. A further requirement of such substrate surface, in accordance with the invention, is the surface undulations (ridges or grooves) which are themselves responsible for liquid crystal alignment in whole or in part (in the unenergized or energized condition). Surface ridges or grooves, to meet the inventive requirement, must represent a change in elevation from the surface plane of a minimum at least from a practical standpoint of the order of 10 angstrom units. In general, preferred depth (or height) of such grooves (or ridges) is a fraction of the space between such grooves or ridges. Optimum alignment can result from a variety of spacing—depth or elevation—dimensions. See Section 4.

A preferred class of devices, in accordance with the invention, is dependent upon the effect of electrical current or field on the liquid crystalline material. All such devices utilize straddling electrodes which, to minimize electrical energy expenditure, are desirably in intimate contact with the liquid crystalline material. Since devices of concern generally operate at visible or near-visible light wavelengths, it is a requirement of this preferred class of devices that such electrodes be transparent to such light.

Electrode materials meeting the foregoing requirements include tin oxide, variants, such as indium-doped tin oxide, as well as very thin layers of elemental metals. Reflective devices may utilize an electrode which is opaque and such may be composed of any of the usual metallic materials. Prior art devices, in which it was sought to produce alignment on such electrodes, accomplished this end by use of a residue of long chain molecules such as cellulose residue produced by rubbing with lens paper. In accordance with the present invention, such electrode surfaces are desirably free of such residue but are provided with the ridges or grooves responsible for alignment in accordance with the invention. Such contour variations may be produced by transmission through very thin electrodes from underlying grooved or ridged support materials, or they may be produced directly in the electrodes.

The foregoing requirements are, of course, to be applied only to the region within which alignment is desired. This may constitute the entirety of the liquid crystal region or a portion thereof.

b. The Liquid Crystal

Liquid crystals suitable for the practice of the invention do not differ from those otherwise found desirable for device use. As indicated, they may be smectic, nematic, or, as a species thereof, cholesteric in some operating state. They may be pure substances or they may constitute any of the types of admixtures discussed under the section entitled "Description of the Prior Art". Chemical compositions found particularly useful as nematic phase materials are generally of the form

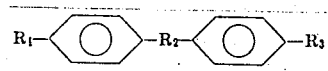

where the end ($R_1$ and $R_3$) and center groups ($R_2$) are given in the following table:

TABLE

| | $R_1$ | $R_2$ | $R_3$ |
|---|---|---|---|
| MBBA | $CH_3O-$ | $-CH=N-$ | $-C_4H_9$ |
| EBBA | $CH_3CH_2O-$ | $-CH=N-$ | $-C_4H_9$ |
| Trans stilbene derivative | $CH_3CH_2O-$ | $-CH=C-$<br>$\quad\quad\ \ \|$<br>$\quad\quad\ Cl$ | $-CH_2CH(CH_3)C_4H_9$ |
| Alkoxybenzylidene aminophenyl-acylate derivatives. | $CH_3(CH_2)_nO$ | $-CH=N-$ | $-O-\overset{O}{\underset{\|}{C}}-(CH_2)_nCH_3$ |
| Cyano-Schiff bases | $N\equiv C-$ | $-CH=N$ | $-OC_4H_9$ |
| Merck NLC N4 | $CH_3O-$ | $O\quad\quad O$<br>$\|\quad\quad\ \|$<br>$-N=N-$ and $-N=M-$ | $-C_4H_9$ |

The invention is premised on alignment due to minimization of elastic forces due to surface ridges or grooves on a surface contacting the liquid crystal layer; and the foregoing compositions, therefore, are exemplary with the inventive approach being equally useful in alignment of any liquid crystals.

Processing

Surfaces meeting the requirements set forth in section 2b above may be prepared by a variety of techniques. Grooves or ridges may be prepared by mechanical means as by use of abrasives, such as use of diamond dust or carborundum, or material of lesser hardness for softer substrates. They may be produced by etching or deposition. Etching may be accomplished chemically or electrochemically with or without masks. Deposition may be accomplished from a vapor or liquid state, for example, by thermal decomposition by vapor. Other techniques include ion milling, selective melting, etc.

They may be produced by replication, always in substrate compositions of the type described, from mixtures which may be produced mechanically or by other means.

Technical and Design Considerations

It has been indicated that alignment of liquid crystal material, in accordance with the invention, is accomplished primarily by reason of surface contour which results in a minimization of elastic energy of the liquid crystal material. It is possible to so design a device that Van der Waals forces also make a contribution, possibly in the same alignment state; possibly in a switched state. A distinct advantage of the inventive approach, however, is elimination of the long chain molecules required for alignment in accordance with earlier techniques (thereby avoiding deleterious chemical reaction and also instability often associated with such long chain molecules). Utilizing the inventive approach, it is now possible to clean a surface before application of the liquid crystalline material and thereby avoid contamination which may also cause deterioration (earlier techniques could not tolerate a cleaning step after deposition of long chain molecules or modification of long chain molecule surfaces).

Based on theoretical development as experimentally verified, it is possible to specify the types of contour changes and spacings most useful for accomplishing the inventive result. As broad limits, it is required that any contour elevational change responsible for alignment be of a dimension of the order of a liquid crystal molecule diameter. This requires a minimum dimension of the order of about 5 angstrom units. A maximum elevational change effective for the inventive purposes is about one micrometer. For dimensions substantially exceeding this depth or height, alignment force becomes relatively weak. Both limits are of practical significance as well. Depths of less than about five angstrom units are not practically attainable. Exceeding the maximum has two further implications; there are often optical disadvantages, in terms of the increased scattering, that may result, and the thicker liquid crystal layers, required to assure continuity across the surface, give rise to other difficulties, for example, due to the need for alignment within the liquid crystalline material spaced at a considerable distance from the aligning interface. On the same basis, preferred limits are defined from about 25 angstrom units to 5000 angstrom units (1/2 micrometer).

For optimum operation, there is an interrelationship between depth or height of grooves or ridges and spacings. Intuitively, maximization of the alignment effect occurs for minimum spacing regardless of elevational change. Such maximation in alignment is desirable where the alignment is permanent, as in a fixed polarizer as well as in the majority of devices in which realignment or disalignment for the bulk of the materials separated from the interfacial layer is sufficient to accomplish desired operation. In fact, for most devices, it is desirable to maintain the alignment of the interface parallel to grooves or ridges at all times so as to minimize the time required to reassume the aligned state after switching.

A theoretical development, in which the various factors (groove depth or ridge height and spacing) are interrelated, is set forth in Vol. 28, No. 26 *Physical Review Letters* pp. 1683–1686 to appear June 26, 1972. The interrelationship may be expressed as $$U_o = CK [A^2/(2\pi L)^4]$$

where
- $U_o$ = additional elastic energy density adjacent to the surface when crystal molecules are aligned across rather than parallel to the surface grooves or ridges,
- K = an approximate average of bend and splay elastic constants of the liquid crystal (see Vol. 25, *Discussion of the Faraday Society*, p. 19 (1958)),
- A = (average) height of ridges or depth of grooves,
- L = (average) distance between ridges or grooves, and
- C = small numerical constant on the order of unity (e.g., 0.2 to 2).

It is seen from the above that alignment energy is proportional to elevation to the second power and intensity proportional to spacing to the fourth power.

The equation was developed for the practical situation in which spacing is at least as great as elevation change (a condition which naturally occurs for all usual processing techniques). In general, operation within the broad range under conditions in which spacing does not exceed 10 times the elevation change assures at least approximate alignment. The probability of nearly perfect alignment is improved as spacing is decreased, as seen from the equation.

While, from a theoretical standpoint, ridge or groove configuration is significant, practical procedures for producing such contour variations invariably result in appropriate configurations, particularly for the finer grooves or ridges which are preferred. In general, such procedures result in groove or ridge widths (as distinguished from spacing) of the same order of magnitude as depth or height. This is true for mechanical scoring as well as chemical techniques and other procedures discussed.

EXAMPLE 1

Scored surfaces were produced on silicate glass microscope slides by use of diamond paste with average particle size of one micrometer imbedded in leather. Slides were rubbed unidirectionally several times in order to result in grooves of depth of approximately 500 angstrom units separated by approximately 1000 angstrom units. The slides were cleaned first with organic solvent, then with chromic and sulfuric acid, rinsed with distilled water, and followed by baking at 500 degrees Celcius for a period of about one hour. A sandwich of para-azoxydianisole of a thickness of approximately 10 micrometers was formed between the two scored surfaces with the grooving parallel. The cell was rotated between cross polarizers with a maximum extinction ratio of 20 or greater. As compared with a direction in which the ridged surfaces of the slides and the polarizer direction defines an angular displacement of approximately 45°.

EXAMPLE 2 – 5

Similar cells were constructed, however, utilizing fused silica in lieu of silicate glass:

| Example | Liquid Crystal Composition |
|---|---|
| 2 | para-azoxydianisole |
| 3 | MBBA |
| 4 | heptyloxyazoxybenzene |
| 5 | octyloxyazoxybenzene |

Extinction ratios are as reported in Example 1.

EXAMPLES 6 and 7

Whereas the above examples are utilized nematic phase material, these examples were operated at reduced temperature so that the liquid crystal media, the compositions utilized in examples 5 and 6, were in the smectic phase. The observed extinction ratio was somewhat less than for the nematic phase due to a slight angular displacement as between the two permitted domains. For this smectic C phase, the overall extinction ratio was about 5:1.

What is claimed is:

1. Device comprising a layer consisting essentially of liquid crystalline material in intimate contact with at least one surface of a non-liquid crystalline material in which device the liquid crystalline material is substantially aligned in a given direction substantially parallel to the interface formed between the said liquid crystalline material and the non-liquid crystalline material of at least a portion of the interface in at least one operating condition of the said device characterized in that the non-liquid crystalline surface of the said interface over at least the said portion is defined by a plurality of substantially linear elevational variations in the non-liquid crystalline surface which are substantially parallel to each other, in which the said elevational variations are within the range of from about five angstrom units to about 10,000 angstrom units, separated by a spacing of from about 5 angstrom units to about 10,000 angstrom units, and in which the said alignment of the said liquid crystalline material is produced primarily by the said elevational variations.

2. Device of claim 1 in which the said interface is substantially free of non-liquid crystalline molecules of a greatest dimension as long as that of the greatest dimension of the molecules of the liquid crystalline material.

3. Device of claim 1 together with means for altering the alignment of at least a portion of the said liquid crystalline material.

4. Device of claim 3 in which the same means includes at least one conductive electrode having a major face substantially parallel to the said interface.

5. Device of claim 4 in which the said means includes two conductive electrodes which straddle at least a portion of the said liquid crystalline material.

6. Device of claim 5 in which the said electrodes are in intimate contact with the said liquid crystalline material.

7. Device of claim 6 in which there is a layer of additional material intermediate at least one of the said electrodes and the said liquid crystalline material which affects the wetting angle of the said liquid crystalline material.

8. Device of claim 7 in which the said additional layer is a surfactant which causes the said liquid crystalline material to align parallel to the said interface.

9. Device of claim 4 in which the said change in alignment results in a second aligned state.

10. Device of claim 9 in which the said second aligned state is essentially orthoganal to the said interface.

11. Device of claim 9 in which the second aligned state is parallel to the said interface.

12. Device of claim 3 in which there are two layers of non-liquid crystalline material both in intimate contact with the said layer of liquid crystalline material.

13. Device of claim 4 in which the surfaces of both of the said layers of non-liquid crystalline material contain elevational variations as described and in which the interface is formed between the said liquid crystalline material and the two layers of non-liquid crystalline material are substantially parallel.

14. Device of claim 13 in which the elevational variations of the two said surfaces are substantially parallel.

15. Device of claim 14 including at least one element which is selectively transmissive for one sense of plane polarized light.

16. Device of claim 13 in which the said elevational variations of the said two non-liquid crystalline layers are essentially non-parallel.

17. Device of claim 16 in which the said elevational variations are essentially orthoganal.

18. Device of claim 17 including at least one additional element which is selectively transmissive for one sense of plane polarized light.

19. Device of claim 3 in which the said means includes means for changing temperature of the said liquid crystalline material.

20. Device of claim 19 in which the second state is essentially disaligned.

21. Device of claim 1 in which the layer consisting essentially of the said liquid crystalline includes a chemical species which is light-absorbent which is composed of elongated molecules and in which their major axes are aligned substantially with the major axes of the molecules of the said liquid crystalline material.

* * * * *

UNITED STATES PATENT OFFICE
CERTIFICATE OF CORRECTION

Patent No. 3,787,110    Dated January 22, 1974

Inventor(s) D. W. Berreman, S. Meiboom, D. L. White, F. J. Kahn

It is certified that error appears in the above-identified patent and that said Letters Patent are hereby corrected as shown below:

Column 1, line 21, change "not" to --no--.

Column 2, line 21, change "increases" to --increase--.

Column 5, line 14, after "invention;" insert --and--;

line 17, after "invention" delete "; and" and insert a period;

line 53, delete "The remainder of the device,";

line 54, delete in its entirety;

line 55, delete in its entirety;

line 56, delete "in conjunction with FIG. 1.".

Column 11, line 5, delete "As compared with a";

line 6, delete in its entirety;

line 7, delete in its entirety;

line 8, delete in its entirety.

Signed and sealed this 9th day of July 1974.

(SEAL)
Attest:

McCOY M. GIBSON, JR.
Attesting Officer

C. MARSHALL DANN
Commissioner of Patents